Sept. 25, 1923.

H. B. KIMMEL

PACKING WASHER

Filed May 10, 1922

1,468,639

Inventor
Harry B. Kimmel
By Stuart C. Barnes
Attorney

Patented Sept. 25, 1923.

1,468,639

UNITED STATES PATENT OFFICE.

HARRY B. KIMMEL, OF HIGHLAND PARK, MICHIGAN.

PACKING WASHER.

Application filed May 10, 1922. Serial No. 559,736.

*To all whom it may concern:*

Be it known that HARRY B. KIMMEL, a citizen of the United States, residing at Highland Park, in the county of Wayne and State of Michigan, has invented certain new and useful Improvements in Packing Washers, of which the following is a specification.

This invention relates to packing members for pipe joints, and has for its object packing members which will take the place of ordinary packing washers and affords a more reliable packing because it is not possible to unseat the packing the way ordinary washers unseat.

I have particularly in mind the joint where a water meter is set in a water line or the joint in a water closet tank pipe. The water pipe is ordinarily provided with a flange and leather washer which is jammed against the end of the intake pipe of the tank. In course of time very often this washer is squeezed out and consequently ceases to act as a packing. The special washer which I have designed cannot be squeezed out and forms a cheap and reliable packing member at this point.

*a* designates the water pipe provided with the usual flange *b* opposite the end of the water closet pipe *c*; *d* designates the usual nut adapted to force the two pipe ends together against the intervening leather washer.

Figure 1:
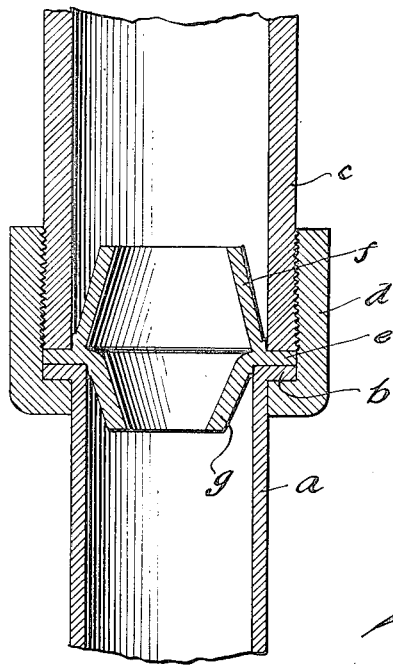
Fig. 1 is a vertical cross section of a water pipe and a water closet tank intake pipe and the joint intervening between them.
Figure 2:
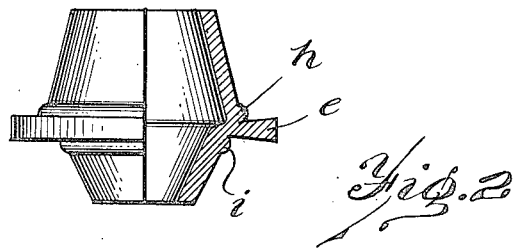
Fig. 2 is a composite section and elevation of the packing member.

In place of the usual washer I use a packing member made of a soft metal fibre or similar material which will easily flow under heavy pressure, such as lead; this member is provided with the usual washer flange *e* and is formed with a body having a pair of cone frustrums *f* and *g*, arranged with abutting bases. The washer flange *e* adjoins the body of the packing member at the line of junction between the two cone frustrum bases. Preferably the washer flange initially tapers from its inside to its outside, as shown in Fig. 2.

Beads *h* and *i* are formed on the packing member on the outside thereof at the bases of the cone frustrums immediately adjoining the washer flange. These beads perform a very important office in the sealing of the joints. They afford surplus soft metal to encounter the inside corners of the pipe ends. The sharp corners dig directly into this bead and cause the soft metal to flow to each side of the corner where it is jammed in between the body of the packing member and the pipe ends. The washer flange being thicker on the outside than the inside permits a flowing of the soft metal to effectually seal the joint at the outside corners of the joint ends. This forms a very good seal.

The double cone frustrums form a body of sufficient resistance to preclude the pressure forcing the pipe ends together, causing the washer flange to disengage from its seat. In fact, the design of the washer flange being of greater thickness on the outside than on the inside and the beads serving in imbedding the pipe corners into the soft material of the packing member prevent the washer working toward the inside of the pipes under the pressure.

What I claim is:

1. A packing washer comprising a body portion having a hollow interior and open at both ends, and a laterally extending flange integral therewith and positioned intermediate of the ends of the said body portion, and beads extending around said body portion at the union between the flange and the body portion, composed of distortable and easy-flowing material whereby the material of said bead is caused to flow into the flange when pressure is applied thereto.

2. In a packing washer, comprising an open end hollow body portion provided with a laterally extending flange integral therewith, said flange thicker on the outside than on the inside and beads composed of distortable and easy-flowing material positioned at the union of the flange and body portion whereby the material of the bead is caused to flow into the flnage when pressure is applied thereto for the purpose of providing material for thickening the inside portion of the flange.

In testimony whereof I affix my signature.

HARRY B. KIMMEL.